United States Patent Office 2,732,378
Patented Jan. 24, 1956

2,732,378
TETRAPYRIDYL-ALKYLENEDIAMINES

Chester John Cavallito, Decatur, Ill., assignor to Irwin, Neisler and Company, Decatur, Ill., a corporation of Illinois No Drawing. Application February 19, 1953,
Serial No. 337,887

10 Claims. (Cl. 260—296)

This invention relates to certain tetrapyridyl-substituted alkylenediamines and is more particularly concerned with (a) compounds having the following formula:

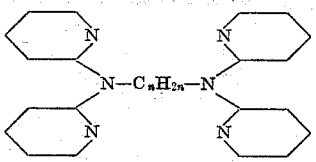

wherein $n$ is an integer between three and twelve, inclusive, (b) acid addition salts and (c) quaternary ammonium salts thereof.

The compounds of the present invention are amorphous hygroscopic solids, whose melting point is difficult to determine. These materials have anti-bacterial, anti-fungal, and trichimonacidal activity, as well as being useful chemical intermediates in the preparation of more complex organic compounds.

Preparation of the compounds of the present invention may be easily accomplished by reacting a desired alkylene halide with a sodio derivative of dipyridylamine in the presence of a hydrocarbon solvent. Alkylene dihalides which are suitable include, for example, propylene dibromide, 1,4-butylene diiodide, 1,5-pentylene dichloride, 1,6-hexylene diiodide, 1,7-heptylene dibromide, 1,8-octylene dichloride, 1,9-decalene diiodide, 1,11-undecalene dibromide, 1,12-duodecalene dichloride, 1,3-butylene dibromide, et cetera. The reaction is usually conducted at reflux temperature, preferably in the presence of an inert atmosphere. Nitrogen or other inert gases may be used as the inert atmosphere material.

A sodio derivative of dipyridylamine may be readily prepared by contacting a solution of dipyridylamine in an aromatic hydrocarbon solvent with a sodium-containing material such as, for example, sodium hydride, sodium amide, sodium metal, sodium azide, et cetera. Sodium hydride is preferred. Representative hydrocarbon solvents which are suitable as the reaction medium include, for example, benzene, xylene, toluene, cumene, et cetera, toluene being preferred. The reaction time between the sodium-containing material and dipyridylamine will vary, depending on the concentration of the dipyridylamine, the amount of solvent used, the particle size of the sodio-forming material, the temperature, et cetera, and generally requires between four and fifteen hours.

The reaction between the alkylene dihalide and the dipyridylamide sodio derivative may be conveniently conducted in the presence of a suitable solvent such as, for example, benzene, toluene, xylene, cumene, dioxane, acetonitrile, et cetera. Reflux temperatures are preferably employed, however temperatures between about 60 degrees and about 150 degrees centigrade are satisfactory. The reaction time will vary between about two and about twenty hours, depending upon the particular materials used and the particular temperature employed. Recovery of the desired reaction product may be readily accomplished by adding ether or petroleum ether to a solvent solution of the reaction mixture, collecting the precipitate which forms, and drying the precipitate. Alternatively, the reaction mixture may be filtered, the filtered solution evaporated, and the residue dried.

Acid addition salts of the compounds of the present invention are readily formed by mixing between about two and about four moles of the desired acid in an inert solvent, for example, dioxane, ether, tertiary-butanol, with one mole of the tetrapyridyl-alkylenediamine dissolved in an inert solvent such as dioxane. Stirring or other agitation will insure efficient contact of the reactants, and upon addition of ether to the reaction mixture, substantially complete precipitation of the salts will result. The salts may be separated and dried in conventional manner.

Representative acids which are suitable for the formation of bis-acid addition salts of the compounds of the present invention include, for example, hydrochloric, hydrobromic, hydriodic, sulfuric, nitric, phosphoric, acetic, butyric, tannic et cetera.

Quaternary ammonium salts of the compounds of the present invention are readily formed by mixing between about two and about four moles of the desired alkyl halide or other alkyl salt in an organic solvent, for example, ethanol, methanol, propanol, dioxane, isopropanol, et cetera, with the tetrapyridyl-alkylenediamine dissolved in a similar solvent. The materials are mixed and heated to a temperature between about 40 and about 150 degrees centigrade for a period of up to ten hours, preferably between about two and about four hours, or until reaction is substantially complete. Upon the addition of ether to the reaction mixture, the precipitate which forms may be collected and dried, thereby yielding a bis-quaternary ammonium salt of the starting material. Representative alkyl halides which are suitable for the formation of quaternary ammonium salts include, for example, methyliodide, methylbromide, ethyliodide, propylbromide, octyliodide, heptylbromide, hexylchloride, pentylbromide, isopentyliodide, butylbromide, et cetera.

The acid addition salts and quaternary ammonium salts of the present invention are amorphous solids, having an indefinite melting point, and generally amber, reddish-black or tan in appearance.

The following examples are given to illustrate one procedure by which the compounds of the present invention may be prepared, but it is to be understood that the said examples are not to be construed as limiting the invention thereto.

PREPARATION

To a mixture of 34.4 grams (0.2 mole) of 2,2'-dipyridylamine in 400 milliliters of dried toluene was added 4.8 grams (0.2 mole) of sodium hydride. The resulting mixture was heated to reflux temperature, in an atmosphere of nitrogen, and the refluxing continued for about eight hours with stirring. The resulting mixture of sodio derivative of dipyridylamine in toluene was used directly in the following examples.

*Example 1.—1,6-bis(2,2'-dipyridylamino)hexane*

A mixture of the sodio derivative of dipyridylamine in toluene prepared as described in preparation supra, was heated to reflux temperature under an atmosphere of nitrogen. With stirring, 24.4 grams (0.1 mole) of 1,6-dibromohexane was added slowly to the mixture. The refluxing and stirring were continued for sixteen hours, at which time the solution was cooled, filtered free of sodium bromide, and the free filtrate concentrated by distillation to yield an amorphous residue. The residue was washed with a warm aliphatic hydrocarbon (Skellysolve B) to remove small quantities of unreacted starting materials. There was thus obtained 1,6-bis- (2,2'-dipyridylamino)hexane, an amorphous solid having an indefinite melting point.

*Example 2.—1,10-bis(2,2'-dipyridylamino)decane*

In a manner similar to that of Example 1, 1,10-dibromodecane was mixed with a mixture of the sodio derivative of dipyridylamine in toluene and the mixture refluxed and stirred. There was thus obtained 1,10-bis(2,2'-dipyridylamino)decane, an amorphous solid having an indefinite melting point.

*Example 3.—1,10-bis(2,2'-dipyridylamino)decane dihydrochloride*

A mixture of 1,10-bis(2,2'-dipyridylamino)decane in dioxane was mixed with three molecular equivalents of hydrogen chloride in ether. The precipitate which resulted was recovered by filtration and dried. There was thus obtained 1,10-bis(2,2'-dipyridylamino)decane dihydrochloride as an amorphous solid having an indefinite melting point.

Analysis:
Calculated: C, 12.81%
Found: C, 13.24%

*Example 4.—1,6-bis(2,2'-dipyridylamino)hexane-bis-methiodide*

A mixture of 1,6-bis(2,2'-dipyridylamino)hexane in alcohol was heated with three molecular equivalents of methyl idoide in alcohol. The mixture was heated at reflux for approximately three hours, cooled and 100 milliliters of ether added. The precipitated material was recovered by filtration and dried. There was thus obtained 1,6 - bis(2,2' - dipyridylamino)hexane - bis - methiodide, as a tan colored solid, shrinking at 79 degrees centigrade and decomposing at 98–100 degrees centigrade. It is soluble in alcohol, hygroscopic and has a molecular weight of 708.5.

Analysis:
Calculated: C, 47.47 I, 35.83
Found: C, 46.68 I, 35.09

*Example 5.—1,10-bis(2,2'-dipyridylamino)decane-bis-ethiodide*

In a manner similar to that of Example 4, ethyl iodide was reacted with 1,10-bis(2,2'-dipyridylamino)decane to yield 1,10-bis(2,2'-dipyridylamino)decane-bis-ethiodide, as a red-black amorphous solid, having a shrinking point of 59 degrees centigrade, melting at 72–82 degrees centigrade, being hygroscopic, soluble in a mixture of fifteen percent water and 85 percent ethyl alcohol, and having a molecular weight of 792.6.

Analysis:
Calculated: C, 51.52 H, 5.85
Found: C, 52.08 H, 6.03

*Example 6.—1,10-bis(2,2'-dipyridylamino)decane-bis-(n-amyl)iodide*

In a manner similar to that of Example 4, 1,10-bis-(2,2'-dipyridylamino)decane was reacted with n-amyliodide to yield 1,10-bis(2,2'-dipyridylamino)decane-bis-(n-amyl)iodide, having a softening point of 70 degrees centigrade and a melting point of about 80 degrees centigrade, being a dark red amorphous solid, soluble in a mixture of ethanol-water and having a molecular weight of 876.8.

Analysis:
Calculated: C, 54.79 I, 28.95
Found: C, 54.15 I, 29.30

*Example 7.—1,10-bis(2,2'dipyridylamino)decane-bis-methiodide*

In a manner similar to that of Example 4, 1,10-bis-(2,2'-dipyridylamino)decane was reacted with methyl iodide to yield (1,10-dipyridylamino)decane-bis-meth- iodide, as a red-black amorphous solid, having a shrinking point of 72 degrees centigrade and melting at about 88 degrees centigrade, a hygroscopic material soluble in a mixture of 25 percent water and 75 percent ethyl alcohol, and having a molecular weight of 764.6.

Analysis:
Calculated: C, 50.27 H, 5.54
Found: C, 50.81 H, 5.58

Pursuant to the procedure described in the examples and description hereinbefore given, other tetrapyridyl-alkylenediamines may be prepared, such as, for example, 1,3-bis(2,2'-dipyridylamino)propane, 1,3-bis(2,2'-dipyridylamino)butane, 1,4 - bis(2,2' - dipyridylamino) - butane, 1,5-bis(2,2'-dipyridylamino)pentane, 1,4-bis(2,2-dipyridylamino)heptane, 1,7 - bis(2,2' - dipyridylamino)-heptane, 1,8 - bis(2,2' - dipyridylamino)octane, 1,9 - bis - (2,2' - dipyridylamino)nonane, 1,11 - bis(2,2' - dipyridyl - amino)undecane, 1,12 - bis(2,2' - dipyridylamino)duo - decane, 1,9 - bis(2,2' - dipyridylamino)duodecane; other acid addition salts of the foregoing organic compounds such as, for example, the nitrate, sulfate, picrate, tannate, phosphate, acetate, et cetera may be prepared; other quaternary ammonium salts of the foregoing organic compounds, such as, for example, the methobromide, methiodide, ethobromide, ethiodide, propyliodide, propylbromide, propylchloride, butylbromide, butyliodide, butylchloride, pentylbromide, et cetera, may be prepared.

Various modifications may be made in the method of the present invention without departing from the spirit or scope thereof and it is to be understood that I limit myself only as defined in the appended claims.

I claim:
1. A compound selected from the group consisting of (a) compounds having the formula:

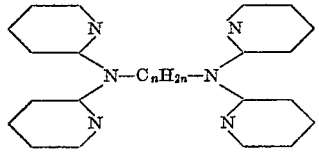

wherein $n$ is an integer from three to twelve inclusive, (b) acid addition salts, and (c) hydrocarbon halide quaternary ammonium salts thereof.
2. 1,6-bis(2,2'-dipyridylamino)hexane.
3. 1,10-bis(2,2'-dipyridylamino)decane.
4. 1,10 - bis(2,2' - dipyridylamino)decane dihydrochloride.
5. 1,6 - bis(2,2' - dipyridylamino)hexane - bis - meth - iodide.
6. 1,10 - bis(2,2' - dipyridylamino)decane - bis -ethiodide.
7. 1,10 - bis(2,2' - dipyridylamino)decane - bis - (n - amyl)iodide.
8. 1,10 - bis(2,2' - dipyridylamino)decane - bis - meth - iodide.
9. A process for the preparation of bis-(dipyridylamino)alkanes which comprises: heating in the presence of an organic solvent the sodio derivatives of dipyridylamino and an alkylene dihalide wherein the alkylene group contains from three to twelve carbon atoms, inclusive.
10. A process for the preparation of bis-(dipyridylamino) alkanes which comprises: heating in the presence of an organic solvent at a temperature between about 60 degrees and about 150 degrees centigrade and in the presence of a hydrocarbon solvent, the sodio derivative of dipyridylamine with an alkylene dihalide wherein the alkylene group contains from three to twelve carbon atoms, inclusive.

No references cited.